Patented May 6, 1941

2,240,805

UNITED STATES PATENT OFFICE 2,240,805

COMPOSITE ARTICLE AND METHOD OF MAKING SAME

Waldo L. Semon, Silver Lake, Ohio, assignor to The B. F. Goodrich Company, New York, N. Y., a corporation of New York No Drawing. Application October 20, 1936, Serial No. 106,567

18 Claims. (Cl. 154—2)

This invention relates to a metal article wholly or partially coated with rubber, and to an improved method of producing the same.

It is an important object of my invention to provide a method whereby rubber may be adhered to metal with a bond that does not weaken rapidly with age.

It has long been recognized that certain metals, notably iron, do not adhere readily to rubber. This difficulty has often been obviated by coating the metal with brass, to which many rubber stocks readily adhere if the brass is of the right composition. Though this method has often caused excellent adhesion, the bond sometimes grew rapidly weaker as the article aged. My improved method which consists in attaching rubber to a cobalt-surfaced metal article overcomes this disadvantage, for the bond between the rubber and metal is unusually resistant to deterioration by aging.

As an illustration of a preferred embodiment of my invention, I will describe in some detail the method by which I electrolytically plate iron with cobalt and adhere a rubber stock to the cobalt surface. I prepare a plating bath of distilled water 1 liter, cobalt sulfate 78.5 grams, and ammonium sulfate 66.5 grams. I add cobalt carbonate until the bath is neutral to litmus. For the anode, I prefer to use electrolytically deposited sheets of cobalt. I heat the plating bath to 30° C., and using the iron article to be adhered to rubber as the cathode, I deposit cobalt for one minute with a current of 3 amperes per square foot of iron. I remove the plated iron and allow it to dry. I prepare a rubber stock containing rubber 72.60 parts by weight, diphenyl guanidine 3.0 parts, zinc oxide 5.35 parts, sulfur 1.75 parts, black petrolatum 16.60 parts, and pine tar .70 part. I apply the stock to the cobalt-plated iron, and cure in a press for 30 minutes at 300° F. The adhesion is so good that the rubber stock tears before it will separate from the metal. The use of a rubber cement made from a similar type of stock will usually cause excellent adhesion of stocks which in its absence give only fair adhesion. In a number of trials varying the rubber stock and conditions of plating, the adhesion without cement varied from 25 to 90 pounds per square inch, and the adhesion using cement varied from 40 to 110 pounds per square inch.

It was found that the conditions under which the cobalt is plated on the metal can be widely varied with slight effect upon the quality of the adhesion. Carbon anodes may be used in place of cobalt. The current density may vary from 3 to 35 amperes per square foot of surface plated without adversely affecting the adhesion. The temperature can be varied between 40° and 90° F. The concentration of the cobalt sulfate in the bath can be as low as 9.8 grams per liter without materially affecting the adhesion, but 39 grams per liter is the smallest amount I use for practical purposes. The distance between the anode and cathode was varied from 1″ to 24″ without detrimental effect to the adhesion.

To show the marked superiority of cobalt plate over brass plate for adhering rubber to metal, I coated one piece of iron with cobalt and a second piece with an equal thickness of brass. I covered both with rubber cement, applied a rubber stock, and curved them in a press. Excellent adhesion was obtained in both cases. I subjected both pieces of rubber-covered metal to artificial aging in a Bierer bomb at 70° C. under a pressure of 300 pounds per square inch of oxygen. After sixteen hours, the rubber on the brass could be removed easily. After twenty four hours, there was a sticky layer between the rubber and the brass. The adhesion of the rubber to the cobalt plated metal was still good after ninety six hours in the bomb. After aging in the air for a year, the rubber was still firmly bound to the metal. This example clearly illustrates that cobalt plate gives a bond between rubber and metal which ages much better than the corresponding brass bond.

It will be evident to anyone skilled in the art that the cobalt need not be electrolytically deposited on the metal in order to give a surface which may be adhered to rubber. The cobalt coating may be uniformly applied to the surface by projecting or impacting the cobalt in a molten state, as by a nozzle. When the cobalt coating is applied in this manner, the molten cobalt is driven against the surface of the metal in finely divided form and adheres strongly to the metallic surface. The metal may be dipped in molten cobalt to form the cobalt surface. If the metal to be adhered to rubber is above cobalt in the electromotive series, it may be dipped in a bath containing a cobalt salt and an acid or modifying salt such as magnesium chloride. The bath may be molten, or it may be composed of the salts in aqueous solution. All of these methods will produce coatings of cobalt to which rubber will firmly adhere.

In general, very thin coatings of cobalt are sufficient to produce good adhesion. Coatings of the order of $8 \times 10^{-7}$ to $8 \times 10^{-6}$ centimeters are usually enough. It is an advantage of this method that coatings which are somewhat thicker than the minimum thickness required do not show the decided tendency to peel which is observed in adhesions obtained by means of copper or brass coatings. As the coating grows too thick separation occurs in the cobalt layer itself rather than between the cobalt and the base metal.

I use the term "cobalt surface" to include not only surfaces of pure cobalt, but also any other surfaces containing a large amount of cobalt. The presence of other metals in the cobalt does not usually affect the adhesion adversely, and it may even improve it. A cobalt surface containing five per cent. of nickel gives excellent adhesion to high zinc rubber stocks. Cobalt surfaces containing iron, copper, zinc, and other metals will also give excellent adhesion.

The cobalt may, of course, be deposited upon other metals than the iron used in the illustration. Among the metals and alloys upon which a cobalt surface may be used to good advantage to secure adhesion to rubber are aluminum, steel, stainless steel, dural, magnesium, brass, bronze, monel metal, copper, zinc, lead, and tin.

The rubber which is to be adhered to the cobalt surface must be a vulcanizable stock containing sulfur. Unless otherwise specified, the term "rubber" is employed in the appended claims to include mixtures of rubber, reclaim, or synthetic rubber with sulfur whether or not admixed with fillers, pigments, softeners, antioxidants, or accelerating agents. The term "rubber cement" is employed in the appended claims to include rubber of the above scope dissolved in benzol, gasolene, or other suitable solvent, whether or not admixed with fillers, pigments, softeners, antioxidants, or vulcanizing or accelerating agents.

While I have described one embodiment of my invention in detail, I do not intend to confine myself to the particular method or to the particular ingredients and proportions I have set forth, since many changes may be made without departing from the spirit and scope of the invention as defined in the appended claims.

I claim:

1. The method of making a composite article which comprises adhesively vulcanizing rubber to a metallic cobalt surface by means of heat and pressure.

2. The method of making a composite article which comprises adhering rubber to a metallic cobalt surface by applying rubber cement to the cobalt surface, superposing the rubber, and subjecting the assemblage to heat and pressure.

3. The method of making a composite article which comprises adhering rubber to a metal by depositing a metallic cobalt surface upon the metal and adhering the rubber to the cobalt surface.

4. The method of making a composite article which comprises adhering rubber to a metal by depositing a metallic cobalt surface upon the metal, superposing the rubber, and subjecting the assemblage to heat and pressure.

5. The method of making a composite article which comprises adhering rubber to a metal by depositing a metallic cobalt surface upon the metal, applying rubber cement, superposing the rubber, and subjecting the assemblage to heat and pressure.

6. The method of making a composite article which comprises adhering rubber to a metal by electrolytically depositing a metallic cobalt surface upon the metal, superposing the rubber, and subjecting the assemblage to heat and pressure.

7. The method of making a composite article which comprises adhering rubber to a metal by electrolytically depositing a metallic cobalt surface upon the metal, applying rubber cement, superposing the rubber, and subjecting the assemblage to heat and pressure.

8. The method of making a composite article which comprises adhering rubber to iron by depositing a metallic cobalt surface upon the iron, applying rubber cement, superposing the rubber, and subjecting the assemblage to heat and pressure.

9. The method of making a composite article which comprises adhering rubber to iron by electrolytically depositing a layer of pure metallic cobalt upon the iron, superposing the rubber, and subjecting the assemblage to heat and pressure.

10. The method of making a composite article which comprises adhering rubber to aluminum by depositing a metallic cobalt surface upon the aluminum, applying rubber cement, superposing the rubber, and subjecting the assemblage to heat and pressure.

11. A composite article composed of a metal base with a metallic cobalt surface and a layer of vulcanized rubber integrally bonded into a whole.

12. A composite article composed of a metal base with a metallic cobalt surface, a layer of rubber deposited from rubber cement, and a layer of vulcanized rubber, all of which are integrally bonded into a whole.

13. A composite article composed of a metal base, a layer of pure metallic cobalt, and a layer of vulcanized rubber, all of which are integrally bonded into a whole.

14. A composite article composed of a metal base, a layer of pure metallic cobalt, a layer of rubber deposited from rubber cement, and a layer of vulcanized rubber, all of which are integrally bonded into a whole.

15. A composite article composed of an iron base with a metallic cobalt surface and a layer of vulcanized rubber integrally bonded into a whole.

16. A composite article composed of an iron base, a layer of pure metallic cobalt, and a layer of vulcanized rubber, all of which are integrally bonded into a whole.

17. A composite article composed of an aluminum base with a metallic cobalt surface and a layer of vulcanized rubber integrally bonded into a whole.

18. A composite article composed of an aluminum base with a metallic cobalt surface, a layer of rubber deposited from rubber cement, and a layer of vulcanized rubber, all of which are integrally bonded into a whole.

WALDO L. SEMON.